US012785610B2

(12) United States Patent
Mayer et al.

(10) Patent No.: US 12,785,610 B2
(45) Date of Patent: Nov. 3, 2026

(54) MOTOR CONTROL UNIT FOR A POWER TOOL

(71) Applicant: C. & E. Fein GmbH, Schwaebisch Gmuend (DE)

(72) Inventors: Bernd Mayer, Ellwangen (DE); Bernd Mayer, Lauchheim (DE); Eberhard Schumacher, Stuttgart (DE)

(73) Assignee: C. & E. Fein GmbH, Bargau (DE)

( * ) Notice: Subject to any disclaimer, the term of this patent is extended or adjusted under 35 U.S.C. 154(b) by 273 days.

(21) Appl. No.: 18/607,465

(22) Filed: Mar. 16, 2024

(65) Prior Publication Data

US 2024/0313691 A1 Sep. 19, 2024

(30) Foreign Application Priority Data

Mar. 16, 2023 (EP) .................................... 23162462

(51) Int. Cl.
*H02P 29/64* (2016.01)
*B25F 5/00* (2006.01)

(52) U.S. Cl.
CPC ................ *H02P 29/64* (2016.02); *B25F 5/00* (2013.01)

(58) Field of Classification Search
CPC .................................. H02P 29/64; B25F 5/00
See application file for complete search history.

(56) References Cited

U.S. PATENT DOCUMENTS

| | | | | |
|---|---|---|---|---|
| 5,206,575 | A * | 4/1993 | Nakamura | H02P 23/26 318/807 |
| 9,800,139 | B2 * | 10/2017 | Skinner | H02M 1/4216 |
| 11,400,562 | B2 * | 8/2022 | Tsai | B24B 23/02 |
| 2020/0086457 | A1 * | 3/2020 | Tsai | H02P 29/60 |
| 2022/0407174 | A1 * | 12/2022 | Sandahl | H01M 50/249 |

FOREIGN PATENT DOCUMENTS

| | | | | |
|---|---|---|---|---|
| DE | 102007014346 | A1 | 10/2008 | |
| DE | 102016203728 | A1 * | 9/2017 | H02P 29/68 |
| DE | 102018123661 | A1 | 3/2020 | |
| EP | 3849076 | A1 * | 7/2021 | H02P 29/60 |
| JP | 2002018745 | A | 1/2002 | |

* cited by examiner

*Primary Examiner* — Thai T Dinh
(74) *Attorney, Agent, or Firm* — Muncy, Geissler, Olds & Lowe, P.C.

(57) ABSTRACT

A motor control unit for a brushless electric motor of a power tool, in particular a hand-held power tool, having an electronic control device having a power limiting device designed to limit the power absorption of the electric motor in order to restrict the power absorption of the electric motor to a maximum permissible maximum power value and to adjust this maximum power value during the operation of the electric motor as a function of the at least one temperature value. A corresponding power tool and a method are also provided.

19 Claims, 4 Drawing Sheets

MOTOR CONTROL UNIT FOR A POWER TOOL

This nonprovisional application claims priority to European Application No. 23162462.8, which was filed on Mar. 16, 2023 in Europe, and which is herein incorporated by reference.

BACKGROUND OF THE INVENTION

Field of the Invention

The invention relates to a motor control unit for a power tool, in particular an EC angle grinder, the power tool with this motor control unit, and a corresponding method for control.

Description of the Background Art

Depending on the application, power tools, in particular angle grinders, are operated in the overload range for long periods of time. An overload range is defined as power absorption that the angle grinder cannot withstand thermally over the long term. So, by definition, there are one or more components that determine the thermal limit in the overload range. These are often electronic components, battery cells or even an enclosed motor.

According to the conventional art, in order to comply with the thermal limits, either the temperature is recorded by sensors on the respective component or it is calculated by means of another temperature reference and a simultaneous loss estimation (usually based on the motor current via software). If the measured temperature exceeds a specified limit value, the machine is shut down due to overtemperature. The user is often subsequently informed of this shutdown reason by a visual display in order to prevent confusion with a malfunction.

The state of the art includes variable speed machines, especially in the field of brushless drives, which offer the advantage of a uniform work result for many applications. The disadvantage of this speed control, however, is that the user lacks recognizable feedback about the power absorption of the machine. Unfortunately, the work processes for angle grinders are so varied that it is hardly possible to draw conclusions about the power absorption from the work process itself. The user usually experiences a shutdown due to overtemperature suddenly and while concentrating on the workpiece. Then, as a rule, work has to be interrupted so the machine can cool down.

When designing the drive, the state of the art attempts to place the overload range of the drive on the motor's natural characteristic 30 (FIG. 1: the speed drops because there is no longer any control reserve). However, high-performance brushless motors are on the one hand very rigid in terms of speed, and on the other hand, this design can usually only be used for the highest speed setting. The lower speed settings are also electronically controlled and only reach the natural characteristic of the motor well into the overload range. Overload protection by means of a fixed current limitation is part of the state of the art.

If the thermally determining components are at a non-critical operating temperature, it would be preferable if the machine also allowed for overload situations without power limitation. Also, in addition to the load current, other parameters such as the degree of contamination or the actual source voltage are added to the heating of the machine.

SUMMARY OF THE INVENTION

It is therefore an object of the invention to maintain the operational capability of the power tool for all operating conditions that vary with temperature.

A motor control unit according to an example of the invention for a, e.g., brushless, electric motor of a power tool, for example a hand-held power tool, comprises: a temperature sensor device by means of which at least one temperature value of a power tool component, which is influenced by the operation of the electric motor, can be determined; a power measuring device that is set up to detect a power absorption value that characterizes the power absorption of the electric motor; and an electronic control device that has a power limiting device designed to limit the power absorption of the electric motor in order to restrict the power absorption of the electric motor to a maximum permissible maximum power value ($P_{Max}$) and to adjust that maximum power value during the operation of the electric motor as a function of the at least one temperature value.

By means of this dynamic adjustment of the maximum power value, the desired power limitation is achieved, with which the user receives the necessary feedback on the current load state of the machine via a variable speed based on variable load, in particular via an increased speed drop with increased load. There is a focus on the actual temperature of key components so that the power tool can be used flexibly, depending on the situation.

If the user continues to operate the machine limited by the present invention in the now recognizable overload range (significantly lower speed), the motor control unit can be advantageously designed in such a way that the conventional overtemperature cut-off intervenes in the event of the expected overtemperature. At this point in time, however, this overtemperature cut-off is not unexpected with suitable parameters and is barely reached when working with the insert tool as intended. Advantageously, the parameter space shown in FIG. 2 can be defined in such a way that an individual setting is achieved for each setpoint speed for either a higher protection against an overtemperature cut-off (according to the invention) or for a higher overload capacity with a faster onset of an overtemperature cut-off (conventional).

The electric motor can be a DC motor, preferably a brushed DC motor, even more preferably a brushless DC motor (EC DC motor), preferably an enclosed or fully enclosed electric motor, preferably a DC shunt motor.

The power tool can be an angle grinder, a grinder, a core drill, or a saw.

The temperature sensor device preferably can have at least one, preferably exactly one temperature sensor that is thermally bondable or thermally bonded to a power tool component. This power tool component is, in particular, one that shapes or decisively determines the maximum continuous power of the power tool through its thermal design, i.e., is a thermally determining power tool component. An example of a component that does not shape the operating temperature, but limits the continuous power, can be a bridge rectifier of the electronics of a power tool. The bridge rectifier can only make a negligible contribution to the heating of the machine, but, right after the motor, can be the thermally determining/limiting component. In many cases, the power tool component is a part of the electric motor or power electronics, and in the case of battery-powered power tools, the power tool component can also be a part of the battery. It is particularly important to reproducibly record the temperatures characteristic of the electric motor's various operating states, characterized by speed and torque. Several temperature sensors can be provided, from which, for example, by means of mathematical operations, in particular averaging, the desired temperature can be determined. A temperature sensor may be in thermal and/or physical contact with a power tool component, which may be a thermally limited component, in particular.

The temperature sensor device can record a temperature by measuring a voltage, current, or resistance, or by means of optical measurement.

The motor control unit can be used in particular to determine the speed of a variable speed electric motor, in particular by means of a speed control. In addition, the motor control unit comprises the power limiting device and, preferably, a speed control. The speed control is a device of the motor control unit for influencing the actual speed. The speed control is preferably set up, in particular programmed, to set the speed by means of a control loop to a setpoint speed specified by the user, in particular in so far as this setpoint speed is achievable when the maximum power value ($P_{max}$) is available, which is, in particular, adjusted by the power limiting device.

The motor control unit preferably can have a power level that is driven in particular by the speed control and from which the electric motor draws its power. The power level is preferably controlled with pulse width modulation. The control with pulse width modulation allows for a high dynamic range when energizing the electric motor with low losses in the power level. In the case of a brushless DC motor, the commutation is implemented electrically or electronically.

The power measuring device can be a current measuring device by means of which a current (I) absorbed by the electric motor is recorded as a current value, wherein the power absorption value is a current value (I) which is preferably multiplied by a fixed voltage (U) or preferably by the voltage value (U) recorded by a voltage measuring device. The current measuring device and/or voltage measuring device may be part of the power level or can be designed separately from the power level. For the sake of simplicity and assuming a known and constant supply voltage at the supply voltage and power level, and thus at the electric motor, the power absorption (P) can also be represented solely by a current measured by a current measuring device (I).

The control device may have or is formed of at least one, several, or all of the following components: microcontroller, CPU, data memory, data interface, power supply interface. Preferably, the control device is programmable. Functions of the control device may be implemented in hardware and/or software, in particular by means of electronic components and/or appropriate programming.

The control device is preferably programmed to limit the power absorption (P; I) of the electric motor to the maximum permissible power value ($P_{max}$) and adjust this maximum power value ($P_{max}$) during the operation of the electric motor as a function of the at least one temperature value (T). To this end, the control device has, in particular in a data memory of the control device or of the motor control unit, a program code which, when executed by a microcontroller of the control device, causes the power absorption (P; I) of the electric motor to be restricted to the maximum permissible power value ($P_{max}$) and this maximum power value ($P_{max}$) to be adjusted during the operation of the electric motor as a function of the at least one temperature value (T).

The control device can have a speed control which is set up, in particular programmed, to control a speed n, wherein the speed n to be set is dependent on a setpoint speed $n_{soll}$, which can be preset by the user, the torque M present, the maximum power value $P_{max}$, in particular the maximum motor current $I_{max}$~$P_{max}$, and the at least one temperature value T, and the resulting speed n can be, for example, a function $n(n_{soll}; M_{ist}; P_{max}; T)$ of the setpoint speed $n_{soll}$, of the present torque is $M_{ist}$, of the maximum power value $P_{max}$, in particular of the motor current $I_{max}$~$P_{max}$, and of the at least one temperature value T. The speed control can be implemented by the program code described above, and/or by another program code and/or an electronic circuit.

The speed control can be set up in such a way that the speed set or regulated by presetting the setpoint speed can be reduced (or also: increased again after reduction), preferably exclusively, by the power limiting device, in particular the current limiting device, but in particular does not depend directly on the power or the current. The speed control is preferably set up, in particular programmed, to determine the speed to be set, in particular as a function of a setpoint value $n_{soll}$, independently of the current $I_{mot}$, as long as the maximum power value $P_{max}$ is not exceeded, and/or on condition that the at least one temperature value, in particular a temperature T, is not exceeded.

The maximum power value $P_{max}$ can be a function $P_{max}(n_{soll}; T)$ of the at least one temperature value T and the setpoint speed $n_{soll}$.

The maximum motor current $I_{max}$ can be a function $I_{max}(n_{soll}; T)$ of the at least one temperature value T and the setpoint speed $n_{soll}$. In this way, a parameter space by which $P_{max}$ is defined can be easily implemented.

There are various control options for implementing this power limitation in conjunction with an existing speed control. The variant to be preferred can depend, among other things, on the type of source voltage (AC or DC), the response behavior of the controlled system, the possibility of intervening in the control variable and/or on the programmatic requirements.

The implementation of the selected control variant can be carried out by setting up, in particular programming, the control device or the power limiting device to implement the functionality available according to the variant:

The variant of a current limitation superimposed on the speed control can be used here. This current limitation preferably intervenes, in particular, only when the maximum power value $P_{max}$, which is set based on the setpoint speed $n_{soll}$ and the at least one temperature value T, is exceeded, in particular for a certain duration.

Preferably, in particular exclusively, it is a question of the limitation of the motor current, in particular if the source voltage for the drive (mains or battery) can be regarded as constant in terms of time and, in particular, as load-independent. In particular, if the time constant of the drive is less than that of the source voltage, or if the load dependence of the source voltage is significant, it is preferable that the changes on the source voltage side or the internal resistance of the voltage source can be included in the power limitation, i.e., in the determination of $P_{max}$.

The expression used in the present case " . . . the speed control regulates according to a function" can mean that the speed control is set up, in particular programmed, to implement the control according to the function.

If the current power absorption is below the permitted maximum power, the speed control will preferably first regulate with the full control range via the control variable in order to achieve the specified setpoint speed. For modern drives, the control variable preferably is the duty cycle of one or more PWM signals, which are routed to the power level in order to energize the motor. The current speed is set based on the characteristic curve of the motor and the torque currently required. If the speed controller encounters the maximum possible value for the control variable (duty cycle 1), the drive reaches its natural characteristic for the currently available source voltage.

If the current power absorption or its value, preferably filtered with a time constant, reaches the preset maximum power value, the current limitation can intervene by reducing the maximum output value to the control variable, which can then no longer act up to the maximum possible level. As a result, the speed control remains at its upper stop and the current limitation reduces this upper stop until the maximum permissible power is reached. This power limitation therefore also has a speed-reducing effect.

This drop in speed due to the power limitation, which changes dynamically based on the parameters, acts as feedback for the user regarding the overload situation. If the latter further increases the load or torque, the speed continues to drop significantly. If, on the other hand, the user relieves the load on the power tool to a sufficient extent, the current limitation—preferably with the same filtering of its power value—again allows for the speed control to output the control variable and thus allows for the acceleration of the drive up to full speed.

The dynamic influence of the maximum current or the maximum power according to the invention, however, does not represent a superimposed temperature control of the control system. In particular, it is a dynamic counter-coupling specified by the characteristic diagram (FIG. 2) to slow down the heating by slowing down the user. Consequently, in particular, no temperature is specified as the setpoint temperature, as would be the case with classical temperature control.

The power limiting device, in particular the current limitation, can also be set up in particular to increase the maximum power value again after a previous reduction when the temperature value T decreases or when the load decreases (characterized by a decreasing torque and a decreasing motor current).

The control device can be set up, in particular programmed, to reduce the maximum power value in the event of an increase in the at least one temperature value during the operation of the electric motor, which in particular also further reduces the achievable speed in the upper load range.

The control device can have an overtemperature cut-off, which interrupts the power absorption of the electric motor, thus shutting down the electric motor if the at least one temperature value reaches or exceeds a motor-dependent, specified overtemperature value.

The invention relates in particular to a power tool, in particular a hand-held power tool, with an electric motor, in particular a brushless one, a drive shaft coupled to the electric motor and an output shaft coupled to the drive shaft by means of a gear unit to which a tool can be connected, and a motor control unit according to the invention.

The invention relates in particular to a power tool, in particular a hand-held power tool, with an electric motor, in particular a brushless one, a drive shaft coupled to the electric motor and an output shaft coupled to the drive shaft by means of a gear unit to which a tool can be connected, and a temperature sensor device by means of which at least one temperature value, which is influenced by the operation of the electric motor, of a power tool component, in particular the electric motor, can be determined, a power measuring device designed to record a power absorption value characterizing the power absorption of the electric motor, an electronic control device for controlling the electric motor, which is set up to limit the power absorption of the electric motor, wherein the control device for limiting the power absorption of the electric motor is set up to limit the power absorption of the electric motor to a maximum permissible maximum power value and to adjust this maximum power value during the operation of the electric motor as a function of the at least one temperature value.

The invention also relates to a method for controlling an electric motor of a power tool, in particular a brushless one, in particular by means of the motor control unit according to the invention, comprising the following, in particular computer-implemented, steps:

Recording the at least one temperature value (T), which is influenced by the operation of the electric motor (140), of a power tool component, in particular by means of the temperature measuring device Recording a power absorption value (P; I) characterizing the power absorption of the electric motor, in particular by means of the power recording device;

Setting the power absorption of the electric motor to a maximum permissible maximum power value ($P_{max}$), in particular by means of the control device or the power limiting device;

Adjusting this maximum power value ($P_{max}$) as a function of the at least one temperature value (T), in particular by means of the control device or the power limiting device.

The invention also relates to a computer program and/or a storage medium containing a computer program code, comprising instructions which, when the computer program is executed by a computer, causes it to perform the steps of a method according to the invention.

The invention also relates to a storage medium on which data are stored, which contain a large number of values of the maximum power value $P_{max}$, in particular the maximum motor current $I_{max}$, namely as function $P_{max}(n_{soll}; T)$ or $I_{max}(n_{soll}; T)$ of the at least one temperature value T and the setpoint speed n. In this way, it is easy to make available a parameter space by which $P_{max}$ is set, which can be used by a motor control unit, in particular a power tool, to limit the power absorption of the electric motor to a maximum permissible maximum power value ($P_{max}$) and to adjust this maximum power value during the operation of the electric motor as a function of the at least one temperature value (T).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
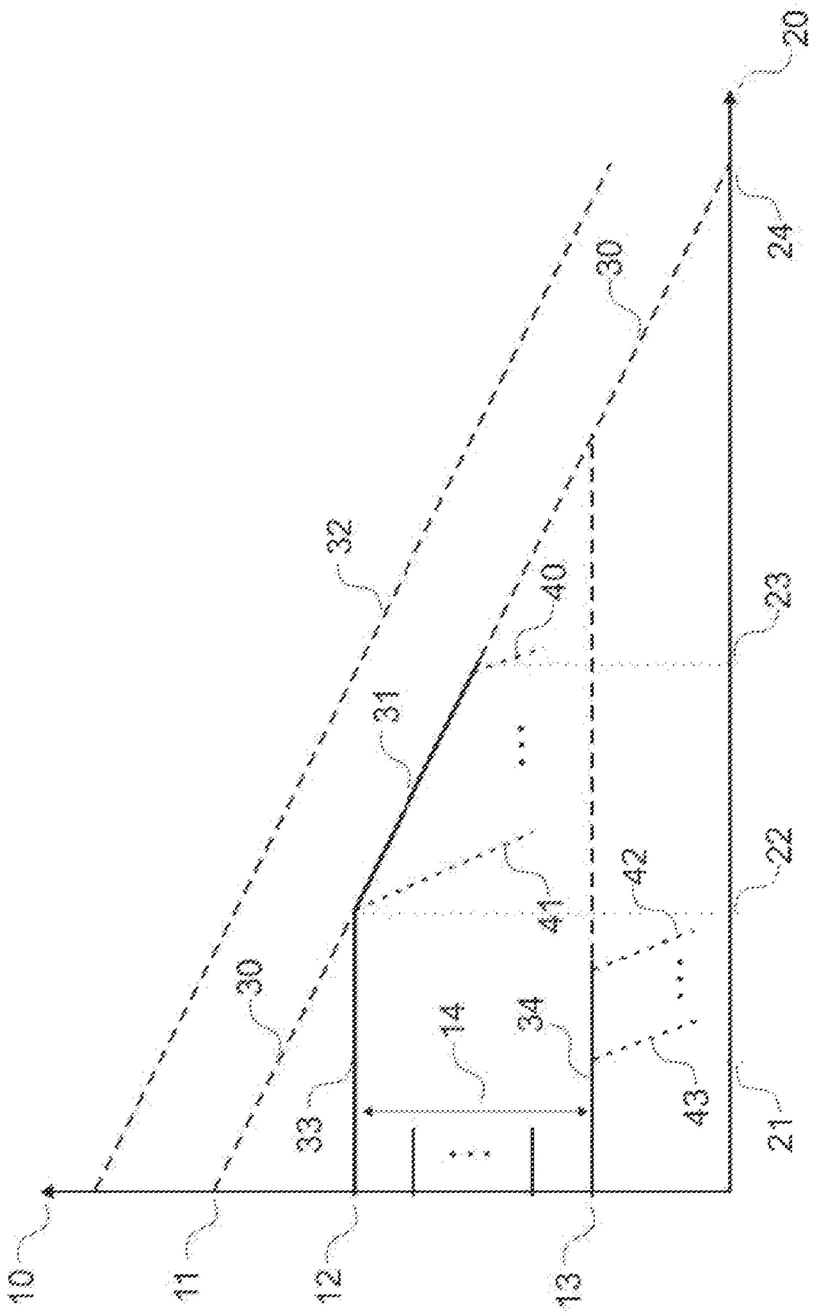
FIG. 1 shows a diagram showing speed characteristics of a variable speed electric motor, in particular the, in particular brushless, electric motor of a power tool, in particular an angle grinder, which contains the motor control unit according to the invention in an exemplary design.

FIG. 1 shows a diagram of motor characteristics, in particular speed characteristics, in which the speed n (10; ordinate) is plotted against the torque M (20; abscissa). These are characteristic curves of a variable speed electric motor, in particular the, in particular brushless, electric motor of an electric motor according to the invention and exemplary power tool, especially an angle grinder. In particular, it is a shunt motor.

The speed characteristic 30 is the natural drive characteristic at nominal voltage:

$$n = n_0 - m^* M,$$

wherein n is the speed, $n_0$ is the unregulated idle speed 11, m is the characteristic gradient, M is the torque. The intersection of the characteristic 30 with the abscissa denotes the locking torque 24 of the drive characteristic.

The nominal voltage of a DC motor is the voltage at which the motor is to operate under nominal conditions. Nominal conditions refer to the operating parameters specified for the motor, including the nominal speed, nominal power, nominal amperage and nominal voltage.

The nominal speed is set according to the speed characteristic, and the choice of nominal voltage depends on where the maximum idle speed should be. For example, at increased voltage, the natural drive characteristic 32 is above the drive characteristic 30 of the nominal voltage and has the same gradient and a higher idle speed. The nominal current of the motor is the result of the maximum permissible continuous load on the motor under thermal conditions. The continuous operating range is limited by the two criteria of the permissible continuous torque and the limit speed. For thermal reasons, the motor can only be loaded with the maximum permissible continuous current, but higher currents (torques) are permitted for short periods of time as long as the winding temperature remains below the critical value. The maximum permissible continuous current also depends on the specified setpoint speed and the associated cooling capacity of the fan wheel, which is usually connected to the motor shaft in power tools. Phases of increased currents are temporary, wherein the thermal time constant of the winding or other thermally determining power tool components, e.g., power semiconductors, is a measure of how long such short-term overloads may last. The order of magnitude of the times with overload depends on the motor current and starting temperature of the thermally determining power tool component and ranges from a few seconds to a few minutes.

The winding is heated by power heat losses, and it is important that the resulting heat is effectively dissipated to avoid overheating. This is especially important for fully enclosed motors. According to the invention, overheating and overloading are avoided by limiting the power absorption of the electric motor as a function of the (increased) temperature. The user receives feedback for their work with the power tool through a reduced speed due to the power absorption limitation.

The maximum permissible continuous current is preferably chosen such that it does not exceed the maximum winding temperature under standard conditions (25° C. ambient temperature, no heat dissipation via the flange, free air circulation). This nominal current is strongly dependent on the type of winding, wherein thin-wire windings may have smaller nominal currents than thick-wire windings. Graphite brushed motors have an increased friction loss at higher speeds, which is eliminated with EC motors. Iron losses in the form of magnetic reversal and eddy current losses also increase with increasing speed in EC motors and generate additional heating. Simultaneously, the cooling air flow increases with higher speeds and, depending on the thermal design, also the cooling capacity, since the fan wheel in power tools is usually firmly connected to the motor shaft. The nominal torque that is assigned to the nominal current depends on the electromagnetic design of the respective motor. The maximum speed of the DC motor is mainly limited by the commutation system. But also other drive elements such as gears, bearings, imbalances or maximum spin speeds are relevant.

In the diagram in FIG. 1, some straight lines are plotted with a gradient that differs from the gradient m of the natural drive characteristic, namely they have a steeper slope $m_2$, i.e., with a higher value of $m_2>m$:

The drive characteristic 40 with power limitation at the highest speed setting and low temperature, The drive characteristic 41 with power limitation at the highest speed setting and high temperature, The drive characteristic 42 with power limitation at the lowest speed setting and low temperature, and The drive characteristic 43 with power limitation at the lowest speed setting and high temperature.

These are characteristic curves that occur in an inventive motor having a power limiting device according to the embodiment.

Figure 2:
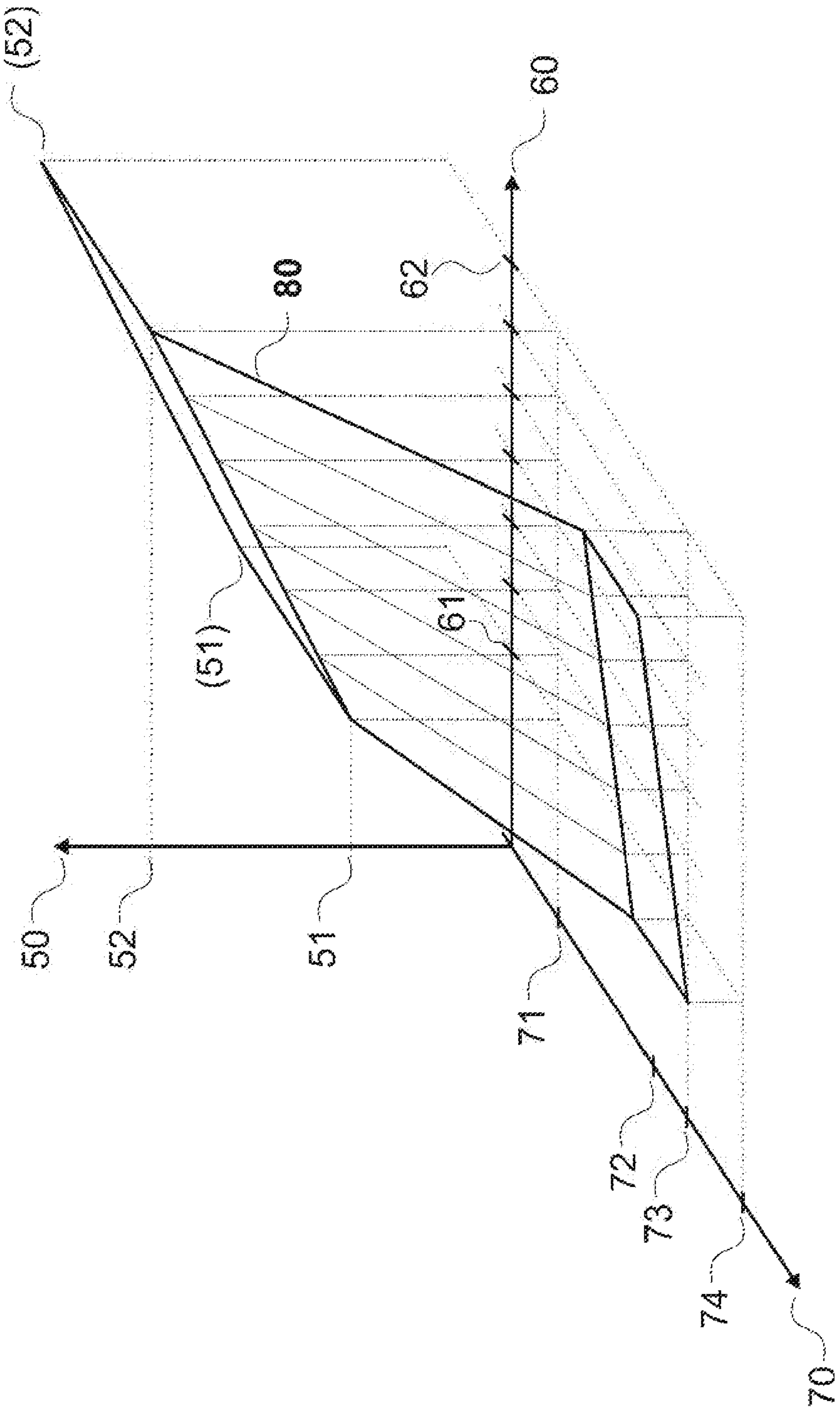
FIG. 2 shows a diagram with a characteristic of the power limitation in the exemplary inventive motor control unit of the electric motor of the power tool according to the invention mentioned in FIG. 1.

The setpoint speed range 14 permitted in operation lies between the lowest setting 13 and the highest setting 12 of the setpoint speed $n_{soll}$. At the highest speed setting 12, there is a variable speed characteristic range 33 in which the speed remains constant even as the torques increase. It is the working area of the electric motor in which continuous operation is possible, namely up to torque 22. The further course of the characteristic curve to even higher torques now depends on the temperature measured on the electric motor, which varies depending on the state:

A cold machine starts with a power limitation that allows part of the natural motor characteristic 31 and only limits the power of the drive at torque 23 by generating the steeper speed drop in the characteristic load 40 that starts there. This behavior applies to temperatures below 71 (FIG. 2). From then on, with increasing temperature, this characteristic load 40 (as a result of a reduced power limitation) then wanders to the characteristic load 41. Therefore, first the drive characteristic 40 and then the drive characteristic 41 are explained:

Drive Characteristic 40:

The drive characteristic 40 is created by the power limitation at the highest permissible power for the speed setting 12. This is effective from the cold state up to a temperature of 71, i.e., even at temperatures below 71. At these temperatures, the power limitation is only reached above torque 23 and can be used, for example, to prevent a shutdown by other protective mechanisms, which are only intended to intervene in the event of a malfunction of the drive. Therefore, the user can use a section of the natural characteristic 31, which allows for the speed to decrease up to torque 23 with the gradient m and above this torque, with the gradient $m_2$. The characteristic load 40 forms the part of the overload range generated by the power limitation at the highest setting 12 and at low temperature 71 and continues until standstill.

From 71 onwards, the power limitation is gradually restricted up to 73 until finally the characteristic load 41 acts at 73.

Drive Characteristic 41:

From the high temperature 73 (see FIG. 2) and up to the cut-off temperature 74, the minimum current permitted by the power limitation for the highest speed setting 12 applies, which generates the drive characteristic 41—this is the drive characteristic at power limitation at the highest setting 12 and at the highest temperature 73, which already acts at torque 22. In the event of an overload above the characteristic curve 33, which can be used in continuous operation, the user immediately experiences a drop in speed with the gradient $m_2$ and can adjust their handling of the power tool accordingly. In particular, it allows the user to work more continuously with the power tool. The drive characteristic 41 generated by the power limitation continues until it comes to a standstill.

At the lowest speed setting 13 there is a variable speed characteristic range 34, in which the low speed remains constant even with increasing torques at least up to torque 21. Again, this is the working area for the continuous operation of the electric motor. The further course of the characteristic curve to even higher torques now again depends on temperature measured at the electric motor or another thermally determining power tool component, which varies according to the state:

Drive Characteristic 42:

If the engine runs at the lowest speed setting 13 and at temperatures lower than or equal to 71 (see FIG. 2), the highest current provided by the power limiting device for the lowest speed setting applies and results in the characteristic load 42 at the appropriate load—this is the drive characteristic at the power limitation at the lowest setting 12 and low temperature 71.

Drive Characteristic 43:

From the high temperature 73 (see FIG. 2) and up to the cut-off temperature 74, the minimum permissible current by the power limitation for the lowest speed setting 13 applies. As a result, the working characteristic runs above torque 21 on the characteristic load 43, which continues until standstill.

At a high temperature 72 just below the critical temperature 73, a warning device of the power tool is activated, which warns the user when the critical temperature 73 is reached. If the maximum permissible temperature of 74 (cut-off temperature) is exceeded, the overtemperature circuit will switch off the engine.

FIG. 2 shows a $P_{max}(n_{soll}; T)$ characteristic of the power limitation according to the invention. The maximum available power in the form of a maximum available current $I_{max}$ is determined here as a function of a pair of values $(n_{soll}; T)$ of the applied setpoint speed $n_{soll}$ and the measured motor temperature T. This characteristic is determined for a power tool in a test bench and then stored in a data memory of the control device.

There is now a specific setpoint speed 60 and a specific temperature 70. The setpoint speed 60 is "relative" and preferably corresponds to the position of a control element (potentiometer, rotary wheel, lever or other operating device) of the machine. The maximum power absorption for a specific position ("power limitation 50") is then determined by the unambiguous point $P_{max}(n_{soll}; T)$ in FIG. 2.

The maximum power absorption $P_{max}$ determines the actual speed n as soon as this power is reached: if the temperature rises, then the actual speed is always reduced at this power, because the dependence $n(n_{soll}; P_{max}(T))$ applies. If the user selects the maximum setpoint speed 62 ($n_{soll\_max}$ at 12), this results, at a low temperature of 71, in a maximum achievable power absorption value $P_{max} \sim I_{max}$, 52 on the very outside in FIG. 2.

At the highest permissible temperature 73 (FIG. 2), as compared to a lower temperature 72 or 71, an increase in the setpoint speed 60 by the user results in a smaller increase in the current $I_{max}$ provided by the power limiting device. Accordingly, at the low temperature 71, as compared to a higher temperature 72 or 73, an increase in the setpoint speed 60 by the user causes a greater increase in the current $I_{max}$ provided by the power limiting device.

If the user keeps the setpoint speed preselection of the power tool unchanged, e.g., the setpoint speed 61 constant, then, based on the maximum available current 51, the current $I_{max}$ provided by the power limiting device decreases in the event that the motor temperature rises from 71 to 72.

The user experiences the temperature-dependent power reduction in the upper load range due to the speed reduction, which produces the characteristic curve 41 at the highest temperature 73 and the highest speed 12, and the characteristic curve 40 at the low temperature 71. This speed reduction warns the user of the overload and allows them to adapt their way of working, in particular to reduce torque to ensure uninterrupted, more continuous work with the tool, in particular to avoid a motor shutdown due to overtemperature.

FIG. 2 does not show a specific speed $n=n_{mot}$, because this is set depending on the load and the permissible current $I_{max}$. The more current $I_{max}$ is allowed, the longer the speed control can keep the speed $n_{mot}$ high. But the speed control 110 is limited by the power limiting device 120 (in this case current limitation) when the current $I_{aktuell}$ for the pairing of setpoint speed $n_{soll}$ and current temperature $T=T_{aktuell}$ becomes too high. This characteristic from FIG. 2 is stored in a data memory 121 of the control device and, by programming the control device accordingly, sets the available power range for the electric motor and thus for the user.

In particular, the input device 101 or actuator may include: a push button, a throttle switch, an adjusting wheel/potentiometer or a digital setpoint setting with buttons and display or a remote-controlled setpoint setting via an electrical signal.

Figure 3:
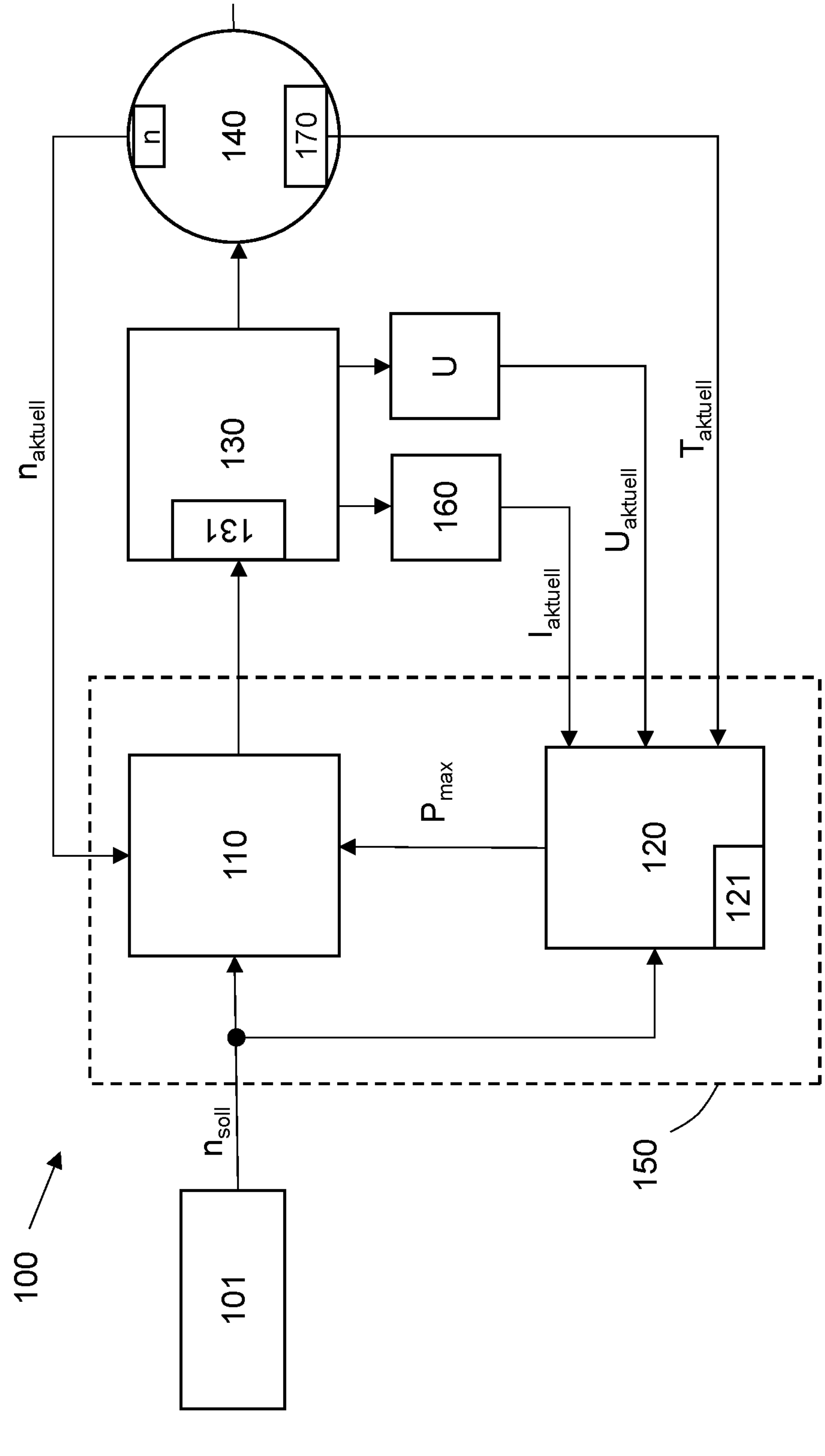
FIG. 3 shows a diagram with a circuit diagram of the inventive electronic motor control unit according to the embodiment of the electric motor of the exemplary power tool of the invention mentioned in FIG. 1.

FIG. 3 shows a diagram with a circuit diagram of a motor control unit 100 of an exemplary power tool 1 according to the invention, which shows in particular the wiring of the electronic control device 150.

The user specifies-via input device 101, e.g., via actuator deflection—a setpoint $n_{soll}$ for the speed, and $n_{soll}$ is input to a speed control 110 and a power limiting device 120.

The speed control 110 acts by inputting a pulse width modulation to the driver 131 of a power setting 130, which provides the current for the electric motor 140. The electric motor uses a current depending on the mechanical load it experiences during operation, i.e., depending on the torque applied to the electric motor.

The electric motor delivers its current speed $n_{aktuell}$ back to the speed control 110, the temperature T measured on the electric motor by means of at least one temperature sensor to the power limiting device 120. The latter also processes the values supplied by the power measuring device 160 of the power level 130 of the current $I_{aktuell}$ currently used by the electric motor, which is proportional to the torque applied to the electric motor and the voltage $U_{aktuell}$.

The power limiting device 120 calculates a power limitation from the currently entered values ($n_{soll}$, $n_{aktuell}$, T, $I_{aktuell}$, $U_{aktuell}$), in the form of a maximum power value $P_{max}$, in this case a maximum permissible current value $I_{max}$. This maximum power value limits the maximum duty cycle that can be output by the speed control 110 to the power level 130 for the control of the motor 140.

Figure 4:
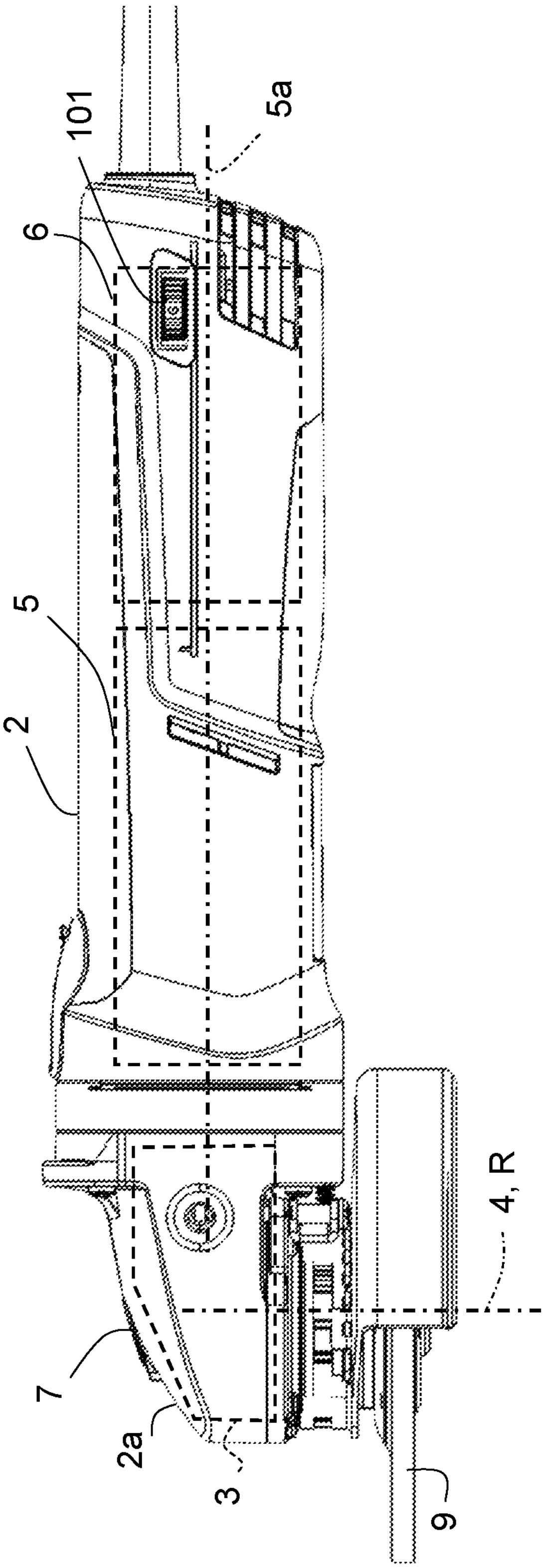
FIG. 4 shows the exemplary power tool according to the invention mentioned in FIG. 1.

FIG. 4 shows a power tool designed as a hand-held machine tool 1, which has a motor control unit according to the invention. The machine tool is shown as an angle grinding machine. However, there is also the possibility that the portable machine tool 1 may have a different design, such as a circular sawing machine, core drilling machine or grinding machine. The gearbox housing 2*a* of the portable machine tool 1 is used to accommodate and/or support a gear unit 3. The gear unit 3 is designed as a right-angle gearbox and contains a rotationally driven output shaft 4 to which an insert tool unit 9 can be fixed by means of the quick-release device 7. A protective cover unit can be attached to the gearbox housing 2*a* or the mounting flange of a bearing plate in a known manner, while an additional handle can also be attached to the gearbox housing 2*a* in a known manner. The drive unit 5 of the portable machine tool 1 is mounted and/or stored in the fully enclosed motor housing. Preferably, the drive unit 5 drives the output shaft 4 in rotation about the axis of rotation R by means of interaction with the gear unit 3. The axis of rotation R of the output shaft 4 runs, at least essentially, perpendicular to a drive rotation axis 5*a* of the drive unit 5. The drive unit 5 is designed as an electric motor unit. Also arranged in the housing 2 is a circuit board 6, which contains the components for the electronic control and power supply of the electric motor, in particular the motor control unit 100 and the electronic control device 150.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A motor control unit for a brushless electric motor of a power tool or a hand-held power tool, the motor control unit comprising:

a temperature sensor via which at least one temperature value that is influenced by the operation of the electric motor of a power tool component is determined;

a power measuring device that is set up to record a power absorption value that characterizes a power absorption of the electric motor; and an electronic control device that has a power limiting device, which, in order to limit the power absorption of the electric motor, limits the power absorption of the electric motor to a maximum permissible power value and adjusts a maximum power value during an operation of the electric motor as a function of the at least one temperature value, wherein the maximum permissible power value is dependent on the at least one temperature value and on a setpoint speed of the electric motor.

2. The motor control unit according to claim 1, wherein the power measuring device includes a current measuring device via which a current absorbed by the electric motor is detected as a current value, and wherein the power absorption value is a current value.

3. The motor control unit according to claim 1, wherein the control device is programmable and programmed to limit the power absorption of the electric motor to the maximum permissible maximum power value and to adjust this maximum power value during the operation of the electric motor as a function of the at least one temperature value.

4. The motor control unit according to claim 3, wherein the control device is programmable and programmed to reduce the maximum permissible maximum power value with increasing temperature linearly or in accordance with a non-linear progression, and to increase it with increasing setpoint speed linearly or in accordance with a non-linear progression.

5. The motor control unit according to claim 1, wherein the electronic control device has a speed control which is set up or programmed to set the speed of the electric motor to be set as a function of a setpoint, independently of the current to regulate it as long as the maximum power value is not exceeded and/or provided that the at least one temperature value does not exceed a pre-determined temperature.

6. The motor control unit according to claim 1, wherein the control device has a speed control which is set up or programmed to regulate a speed n, wherein the speed n is dependent on a setpoint speed specified by the user, the maximum power value or the maximum motor current and the at least one temperature value, and wherein the speed is a function of the setpoint speed of the maximum power value or of the motor current and the at the least one temperature value.

7. The motor control unit according to claim 1, wherein the maximum power value is a function of the at least one temperature value and the setpoint speed, and, wherein the maximum motor current is a function of the at least one temperature value and the setpoint speed.

8. The motor control unit according to claim 1, wherein the control device is set up or programmed so that the limitation of the power absorption of the electric motor or a programmed current limitation is superimposed on the speed control.

9. The motor control unit according to claim 1, wherein the control device is set up or programmed so that the limitation of the power absorption of the electric motor or a programmed current limitation is subordinate to the speed control.

10. The motor control unit according to claim 1, wherein the control device is set up or programmed to reduce the maximum power value during the operation of the electric motor, which also influences the speed in particular, in the event of an increase in at least one temperature value under load.

11. The motor control unit according to claim 1, wherein the control device has an overtemperature cut-off that interrupts the power absorption of the electric motor when the at least one temperature value reaches or exceeds a specified overtemperature value.

12. A power tool comprising:

a brushless electric motor;

a drive shaft coupled to the electric motor and an output shaft coupled to the drive shaft via a gear unit, to which a tool is adapted to be connected; and a motor control unit according to claim 1.

13. The power tool according to claim 12, wherein the power tool is as an angle grinder.

14. The power tool according to claim 12, wherein the power tool is a hand-held power tool.

15. A method for controlling a brushless electric motor of a power tool via a motor control unit according to claim 1, the method comprising:

detecting the at least one temperature value of a power tool component influenced by the operation of the electric motor;

detecting the power absorption value characterizing the power absorption of the electric motor;

setting the power absorption of the electric motor to a maximum permissible maximum power value; and adjusting the maximum power value as a function of the at least one temperature value.

16. A computer program or storage medium comprising a computer program code having instructions which, when the computer program is executed by a computer, cause it to perform the method according to claim 15.

17. The motor control unit according to claim 1, wherein the electronic control device is configured to limit a control variable of a speed control such that, when the power absorption reaches the maximum permissible power value, the speed of the electric motor is reduced.

18. The motor control unit according to claim 1, wherein the maximum permissible power value corresponds to a maximum permissible motor current, and wherein the motor current is limited as a function of the at least one temperature value and the setpoint speed of the electric motor.

19. The motor control unit according to claim 1, wherein the electronic control device is configured to increase the maximum permissible power value when the at least one temperature value decreases.

* * * * *